March 27, 1951   F. M. McBETH   2,546,163
FOOD COOKING APPARATUS
Filed May 20, 1947   3 Sheets-Sheet 1

INVENTOR.
FREEMAN M. McBETH
BY
E. F. Salter
ATTORNEY

March 27, 1951

F. M. McBETH 2,546,163

FOOD COOKING APPARATUS

Filed May 20, 1947

INVENTOR
FREEMAN M. McBETH

BY

ATTORNEY

Patented Mar. 27, 1951

2,546,163

UNITED STATES PATENT OFFICE 2,546,163

FOOD COOKING APPARATUS

Freeman M. McBeth, Harrisburg, Pa., assignor to Macbeth Engineering Corporation, a corporation of Pennsylvania Application May 20, 1947, Serial No. 749,385

10 Claims. (Cl. 99—408)

This invention relates to food cooking apparatus especially adapted for the continuous deep fat frying of coated fish, meats, and other food products.

An important object of the invention is the provision of an apparatus of the character indicated utilizing submerged heat tubes which are mounted within the frying kettle or container in a novel and improved manner.

Another object resides in the provision of baffle means for preventing food fragments and other sediment from settling onto the heat tubes.

A further object of the invention is to provide means for continuously circulating the cooking liquid and removing therefrom sediment which would carbonize on the bottom of the frying kettle and result in pitting thereof as well as contamination of the cooking liquid.

A still further object is to provide an apparatus of the character specified which is of highly simplified construction and which can be manufactured at a relatively low cost.

Other objects and advantages will be apparent from the following description when considered in connection with the accompanying drawings, wherein:

Figure 6 is a view similar to Figure 5 incorporating a modified form of heat tube.

Figure 2:
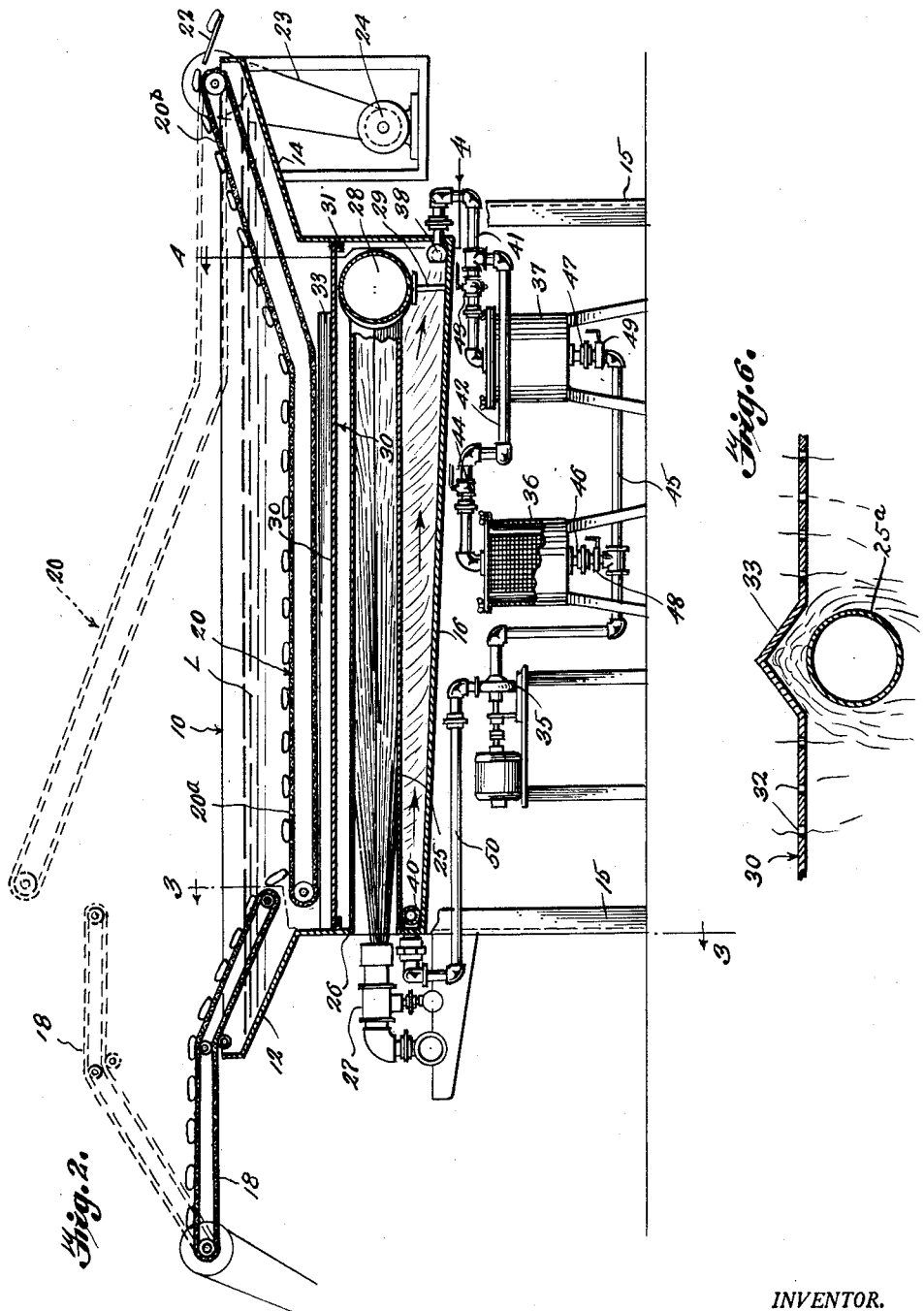
Figure 2 is a longitudinal sectional view therethrough, parts being shown in elevation.
Figure 3:
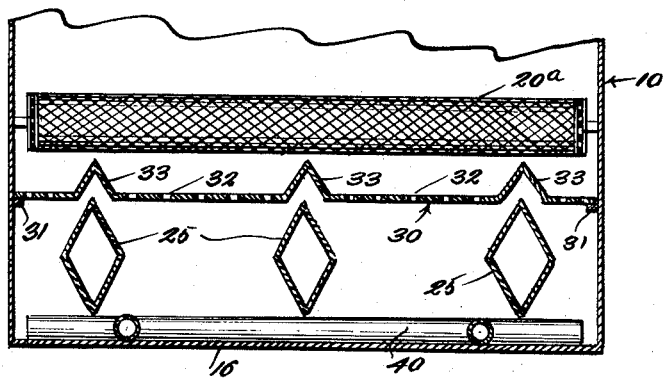
Figure 3 is a section on line 3—3 of Figure 2.

With continued reference to the drawings, wherein a preferred embodiment of the invention is illustrated and like reference characters denote like parts throughout the several views, the numeral 10 generally designates a container or kettle of elongated form containing an appropriate quantity of oil or other cooking liquid L through which the foodstuffs are progressively advanced from the intake or inlet end portion 12 to and out of the discharge or outlet end portion 14 of the kettle. As shown in Figure 2, the kettle is supported by legs 15 and preferably has a sloping bottom 16 that inclines downwardly toward its outlet end 14.

The raw foodstuffs, from any suitable source of supply, are fed into the inlet end 12 of the kettle by an endless conveyor 18 from which they pass onto a second and main endless conveyor generally designated 20 having a major horizontal portion 20a disposed below the level of the cooking liquid and a minor inclined portion 20b extending upwardly above the liquid level for discharging the cooked foodstuffs onto a downwardly inclined chute 22 overlying an appropriate receptacle or part of a packaging mechanism (not shown).

The conveyors 18 and 20 preferably are of the wire fabric and chain type and have their outer ends pivotally mounted so that they may be swung upwardly out of the kettle to the dotted line positions indicated in Figure 2 for cleaning or other purposes. As shown in Figure 2, the conveyor 20 is driven through a suitable motion transmitting connection 23 from a variable speed electric motor or power plant 24. The conveyor 18 is similarly driven whereby the rate at which the foodstuffs are fed into the cooking liquid and moved therethrough may be varied or regulated. The speed at which the conveyor 20 is operated of course determines the extent or duration of cooking of the foodstuffs.

Figure 4:
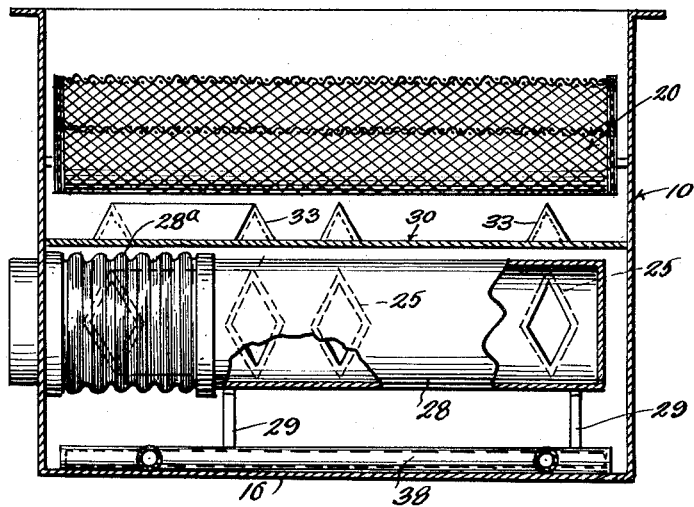
Figure 4 is a similar view on line 4—4 of Figure 2.
Figure 5:
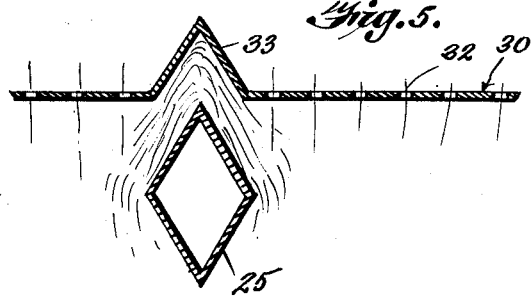
Figure 5 is a fragmentary sectional view, on an enlarged scale, of one of the heat tubes and the overlying baffle plate.

The cooking liquid is heated to the desired temperature by means of a plurality of heat tubes 25 disposed in the lower portion of the kettle and extending longitudinally of the kettle in spaced relation to the bottom and side walls thereof. As shown in Figure 2, the outer open ends of the tubes 25 are mounted in openings in the end wall 26 of the kettle, to which they are secured in a rigid and fluid tight manner, as by welding. Heat is supplied to the tubes by appropriate oil or gas burners 27 associated with the open outer ends of the tubes. The inner or opposite ends of the tubes 25 are connected into a manifold or header 28 arranged transversely of the kettle. With particular reference to Figure 4 it will be seen that the open end of the manifold 28 extends through one of the kettle side walls, with which it has a fluid tight connection as by welding, for communication with a stack or vent (not shown). The longitudinal expansion and contraction of the tubes 25, due to temperature changes, will be greater than that of the kettle side wall to which the manifold is connected and to compensate or allow for this, the manifold is provided with a flexible, annularly corrugated portion or section 28a. The manifold is further provided with supporting feet 29 which rest upon the bottom 16 of the kettle.

The tubes 25 are preferably diamond shaped in cross-section but round or circular tubes 25a, such as shown in Fig. 6, may be employed.

For the purpose of preventing food particles and other precipitating matter from settling and carbonizing on the heat tubes 25, a horizontal baffle plate 30 is disposed between the tubes and the conveyor 20 in spaced relation to both. This plate, which extends for the width and length of the main or body portion of the kettle, is supported upon lugs 31 on the end and side walls of the kettle and embodies perforate and imperforate or solid portions 32 and 33, respectively. The imperforate portions 33 overlie the tubes and the manifold 28 while the perforated portions are disposed between the tubes and also between the side walls of the kettle and the adjacent tubes. It will be further observed that the imperforate portions of the baffle plate are raised and preferably of substantially inverted V-shape so that their downwardly inclined sides will act to direct the settling matter or sediment toward the perforated portions for passage therethrough.

Figure 1:
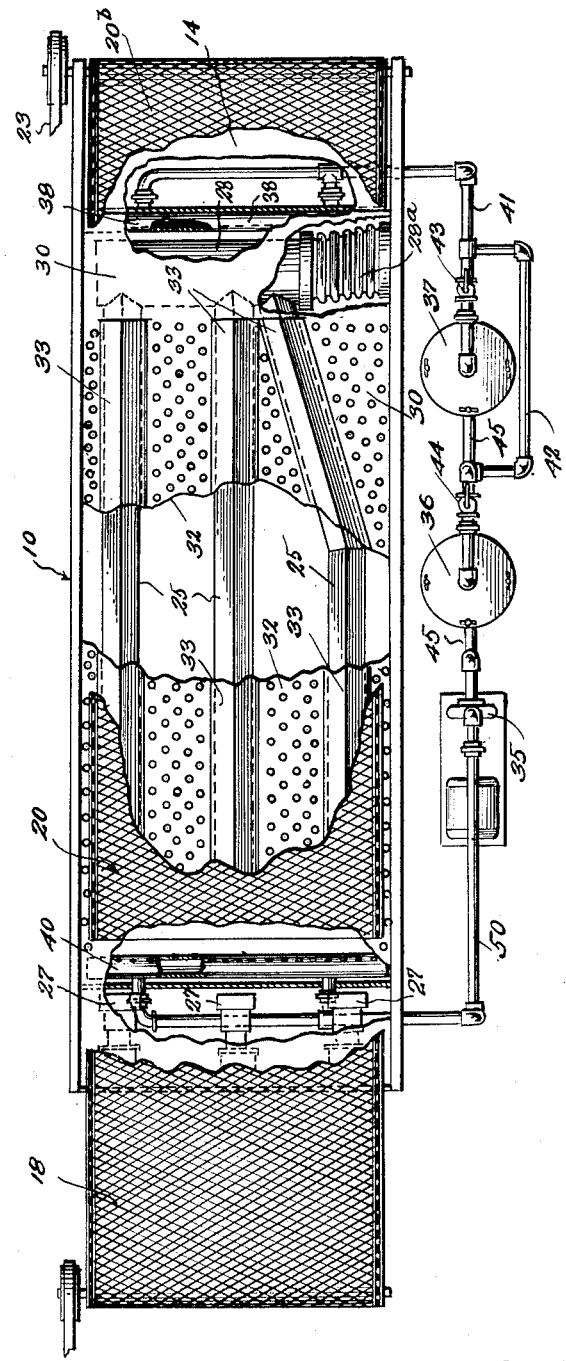
Figure 1 is a top plan view, with parts broken away, of an apparatus constructed in accordance with the invention.

The matter which passes through the baffle plate openings will settle toward or onto the kettle bottom and be carried off by a continuously operating liquid circulating and filtering means which will now be described. By reference to Figs. 1 and 2 it will be seen that such means comprises, in the main, an electric motor driven pump 35 which has its intake or suction side connected to alternately usable filters 36 and 37 which in turn are connected to a withdrawal or take-off header 38 positioned upon the bottom of the kettle at its delivery end 14, and a liquid discharge manifold 40 connected to the output side of the pump and located in the inlet end of the kettle upon or in close proximity to its bottom 16 and having a series of openings for discharging and directing liquid under pump pressure onto the kettle bottom and toward the suction header 38 whereby food particles and other precipitated matter will be moved toward and into the withdrawal header 38. The sediment is drawn from the header 38 into either of the filters 36 or 37 where it is filtered out of the cooking liquid. Thus, the sediment is prevented from accumulating and carbonizing on the kettle bottom which would result in contamination of the cooking liquid and pitting of the kettle bottom.

With more detailed reference to the oil circulating and filtering means, the withdrawal header 38 extends for substantially the full width of the kettle and is connected through pipes 41 and 42 to the tops of the filters 36 and 37. The pipes 41 and 42 are provided with manually operated valves 43 and 44, respectively, which can be manipulated to provide for the discharge of the oil from the header 38 into either of the filters to the exclusion of the other. The intake side of the pump 35 is connected to the bottom of the filters by a pipe 45 and its branches 46 and 47, the latter being provided with hand-operated valves 48 and 49, respectively. The discharge or output side of the pump 35 is connected by a pipe 50 to the manifold 40.

When the machine is in operation, the pump 35 operates continuously at the selected rate and the resultant suction acts through either filter to withdraw the oil from the delivery end of the kettle at a rate commensurate with the discharge of oil into the intake end of the kettle. The filter 36 is cut in and the filter 37 cut out of the pump circuit by closing the valves 43 and 49 and opening the valves 44 and 48, and the filter 37 is put in exclusive operation by opening the valves 43 and 49 and closing the valves 44 and 48. Thus, the filters may be alternated in use to give each the inactive period required for cleaning and other purposes without interrupting the continuous filtering of the cooking oil during the operation of the machine.

Having thus described the invention, what is claimed is:

1. In a food cooking apparatus, a container for the reception of a cooking liquid and foodstuffs, a plurality of heat tubes in said container and opening through and secured to one wall thereof, means for supplying heat to said tubes, and a manifold in said container into which said tubes are connected and discharge, said manifold opening through and being secured to another wall of said container and including flexible means providing for longitudinal expansion and contraction of said tubes.

2. In a food cooking apparatus, a container for the reception of a cooking liquid and foodstuffs, a plurality of heat tubes submerged in the cooking liquid, said tubes extending longitudinally of said container and being secured at one end to an end wall of said container, burners adjacent the said end wall of said container for supplying heat to said tubes, and a manifold arranged transversely of said container into which the opposite ends of said tubes are connected and discharge, said manifold opening through and being secured to one side wall of said container and including an annularly corrugated section providing for longitudinal expansion and contraction of said tubes.

3. In a food cooking apparatus, an elongated container for the reception of a cooking liquid, means for feeding foodstuffs into one end of the container, means for receiving the foodstuffs and conveying the same from the said one end of the container to and out of the opposite end of the container, a plurality of heat tubes in said container and extending longitudinally thereof, said tubes being anchored at one end in an end wall of said container and opening therethrough, burners adjacent the said end wall of the container for supplying heat to said tubes, a manifold arranged transversely of said container into which the opposite ends of said tubes are connected and discharge, said manifold opening through and being secured to one side wall of said container and including an annularly corrugated section providing for longitudinal expansion and contraction of said tubes, and means below said conveying means and overlying said heat tubes for preventing food fragments and other sediment from settling onto said tubes.

4. In a food cooking apparatus, an elongated container for the reception of a cooking liquid, means for feeding foodstuffs into one end of the container, means for receiving the foodstuffs and conveying the same from the said one end of the container to and out of the opposite end of the container, a plurality of heat tubes in said container and extending longitudinally thereof, said tubes being anchored at one end in an end wall of said container and opening therethrough, burners adjacent the said end wall of the container for supplying heat to said tubes, a manifold arranged transversely of said container into which the opposite ends of said tubes are connected and discharge, said manifold opening through and being secured to one side wall of said container and including an annularly corrugated section providing for longitudinal expansion and contraction of said tubes, and a horizontal baffle plate interposed between said conveying means and said tubes and having imperforate and perforate portions, the imperforate portions overlying said tubes and manifold.

5. In a food cooking apparatus, an elongated container for the reception of a cooking liquid, means for feeding foodstuffs into one end of the container, means for receiving the foodstuffs and conveying the same from the said one end of the container to and out of the opposite end of the container, a plurality of heat tubes in said container and extending longitudinally thereof, said tubes being anchored at one end in an end wall of said container and opening therethrough, burners adjacent the said end wall of the container for supplying heat to said tubes, a manifold arranged transversely of said container into which the opposite ends of said tubes are connected and discharge, said manifold opening through and being secured to one side wall of said container and including an annularly corrugated section providing for longitudinal expansion and contraction of said tubes, and a horizontal baffle plate interposed between said conveying means and said tubes, said baffle plate having imperforate raised portions overlying said tubes and perforate portions at the opposite sides of said imperforate portions.

6. In a food cooking apparatus, an elongated container for the reception of a cooking liquid, means for feeding foodstuffs into one end of the container, means for receiving the foodstuffs and conveying the same from the said one end of the container to and out of the opposite end of the container, a plurality of heat tubes in said container and extending longitudinally thereof, said tubes being anchored at one end in an end wall of said container and opening therethrough, burners adjacent the said end wall of the container for supplying heat to said tubes, a manifold arranged transversely of said container into which the opposite ends of said tubes are connected and discharge, said manifold opening through and being secured to one side wall of said container and including an annularly corrugated section providing for longitudinal expansion and contraction of said tubes, and a horizontal baffle plate interposed between said conveying means and said tubes and having imperforate and perforate portions, the imperforate portions overlying said tubes and being of substantially inverted V-shape so that the inclined sides thereof act to direct precipitating matter toward the perforate portions for passage therethrough.

7. In a food cooking apparatus, an elongated container for the reception of a cooking liquid, means for feeding foodstuffs into one end of the container, means for receiving the foodstuffs and conveying the same from the said one end of the container to and out of the opposite end of the container, a plurality of heat tubes in said container and extending longitudinally thereof, said tubes being anchored at one end in an end wall of said container and opening therethrough, burners adjacent the said end wall of the container for supplying heat to said tubes, a manifold arranged transversely of said container into which the opposite ends of said tubes are connected and discharge, said manifold opening through and being secured to one side wall of said container and including an annularly corrugated section providing for longitudinal expansion and contraction of said tubes, a horizontal baffle plate interposed between said conveying means and said tubes and having imperforate and perforate portions, the imperforate portions overlying said tubes and being of substantially inverted V-shape so that the inclined sides thereof act to direct precipitating matter toward the perforate portions for passage therethrough, and means for continuously circulating and filtering the cooking liquid to remove sediment therefrom.

8. In a food cooking apparatus, a container for the reception of a cooking liquid and foodstuffs, a plurality of heat tubes in said container and opening through and secured to one wall thereof, means for supplying heat to said tubes, a manifold in said container into which said tubes are connected and discharge, said manifold opening through and being secured to another wall of said container and including flexible means providing for longitudinal expansion and contraction of said tubes, and means overlying said heat tubes for preventing food fragments and other sediment from settling onto said tubes.

9. In a food cooking apparatus, a container for the reception of a cooking liquid and foodstuffs, a plurality of heat tubes in said container and opening through and secured to one wall thereof, means for supplying heat to said tubes, a manifold in said container into which said tubes are connected and discharge, said manifold opening through and being secured to another wall of said container and including flexible means providing for longitudinal expansion and contraction of said tubes, and a baffle plate disposed above said tubes and having imperforate and perforate portions, the imperforate portions overlying said tubes and manifold.

10. In a food cooking apparatus, a container for the reception of a cooking liquid and foodstuffs, a plurality of heat tubes in said container and opening through and secured to one wall thereof, means for supplying heat to said tubes, a manifold in said container into which said tubes are connected and discharge, said manifold opening through and being secured to another wall of said container and including flexible means providing for longitudinal expansion and contraction of said tubes, and means for continuously circulating and filtering the cooking liquid to remove sediment therefrom.

FREEMAN M. McBETH.

REFERENCES CITED

The following references are of record in the file of this patent:

UNITED STATES PATENTS

| Number | Name | Date |
|---|---|---|
| 2,251,111 | Brown | July 29, 1941 |
| 2,379,155 | Huff | June 26, 1945 |
| 2,452,472 | Keating | Oct. 26, 1948 |